March 5, 1963  G. H. BOOTH  3,080,171
FLANGE SEAL
Filed Feb. 19, 1960
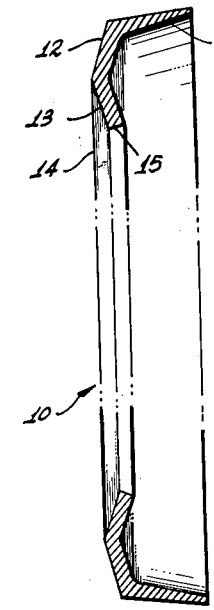
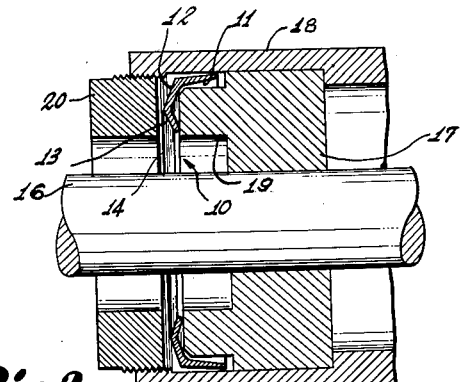
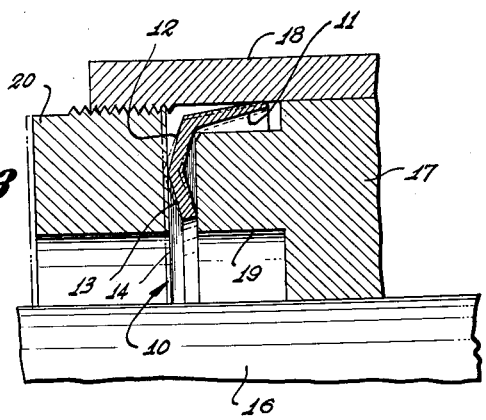
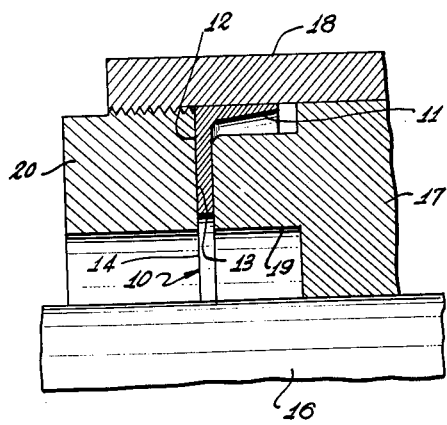
INVENTOR.
GEORGE H. BOOTH
BY *Zuluiden Mattingly & Huntley*
Attorneys

United States Patent Office 3,080,171
Patented Mar. 5, 1963

3,080,171
FLANGE SEAL
George H. Booth, Hermosa Beach, Calif., assignor, by mesne assignments, to Lionel-Pacific, Inc., Los Angeles, Calif., a corporation of Delaware
Filed Feb. 19, 1960, Ser. No. 9,829
5 Claims. (Cl. 277—112)

This invention relates to fluid seals, and more particularly to metal seals for use in preventing leakage of fluid from a housing.

There are many applications in which it is necessary to use fluid seals made of metal. This is particularly true where the fluid is in apparatus that operates in an environment that is too severe to permit the use of sealing elements made of organic material, such as rubber, plastic or the like. For example, non-metal seals are impractical for use at extremely high temperatures, because at such temperatures they undergo changes (e.g., become brittle) that render them unfit to perform their desired function.

Metal ring seals of the prior art have been found impractical for sealing against leakage of fluid along a surface of a cylindrical element. Typically, such prior art seals form an interference fit with the object that it engages. By way of example, to seal the inner wall of cylindrical housing, a ring seal is used that has an outer diameter substantially equal to the inner diameter of the housing. The seal is moved to the desired position in the housing by applying an axial force thereto.

Prior art metal seals of the type above described have several disadvantages. One of the chief disadvantages is that when the seal is forced along the cylindrical object, the abutting metal surfaces wear against each other. This frictional contact results in a plurality of axial scratches being formed in the surfaces of the two elements, and which constitute minute leakage paths for the fluid.

Another disadvantage of prior art metal seals is that they can be used only once. As will be apparent, when the seal is removed, as for replacing parts, the scratches thereon necessitate its replacement with an unmarred seal.

In many devices, any loss of fluid is intolerable. In a servo system, for example, which employs a rotary or a linear actuator, the system is designed for operation with a predetermined amount of fluid. The operation of the system is optimum only when it includes this predetermined amount. Even the loss of a minute amount of fluid adversely affects the desired operation of the system, e.g., by making it "sluggish."

In view of such highly critical demands, considerable care must be exercised in forming the conventional metal seal. To minimize the likelihood of forming the axial grooves above mentioned, the engaging surfaces of the seal and the cylindrical object are highly polished. However, in spite of the various precautions taken, rather high percentage of metal seals made for a particular application are found to be unsuitable. Furthermore, despite the care taken in manufacturing such seals, it is still impossible to avoid the formation of the objectionable axial grooves when the seal is forced into place. All that is accomplished by the painstaking manner in which metal fluid seals are formed is to reduce the size and number of the axial grooves that will be formed; but since such grooves are formed, they constitute effective leakage paths for the fluid.

As will be apparent, considerable time, effort and expense has heretofore been required in making a metal seal for use in a highly critical application. Naturally, the cost of such an item is quite high. Furthermore, due to the numerous operations and inspections that must be performed before determining whether a seal has the desired characteristics, such metal seals are incapable of volume production and uniformity of quality.

It is an object of this invention to provide a unique metal seal that overcomes the above and other disadvantages of the prior art.

It is another object of this invention to provide a seal having a surface portion that can be brought to bear against a surface without damage to the seal or such surface.

A further object of this invention is to provide a metal ring seal for sealing engagement with a cylindrical object without an interference fit, and which can readily be removed from the object without causing the surface thereof to be marred in any way.

It is also an object of my invention to provide a ring seal having a radially movable portion to be brought to bear against or removed from a cylindrical surface, thereby avoiding damage to the surfaces of the seal and the cylindrical object when either applying or removing the seal.

The above and other objects and advantages of this invention will become apparent from the following description taken in conjunction with the accompanying drawing of an illustrative embodiment thereof, in which:

FIGURE 1 is a fragmentary sectional view of a ring seal in accordance with my invention, showing the bend in the transverse portion thereof, and an outwardly flared skirt or flange;

FIGURE 2 is a fragmentary longitudinal sectional view of a cylindrical housing for supporting a shaft on sleeve bearings, with the seal in position preparatory to seating it in place with a nut element;

FIGURE 3 is a fragmentary sectional view of a portion of the end of the housing of FIGURE 2 showing the nut threaded part way into the housing and flexing the transverse portion of the seal to cause the flange to move outwardly toward the inner wall of the housing; and FIGURE 4 is a fragmentary sectional view, similar to FIGURE 3, showing the nut in position wherein the transverse portion of the seal is flattened and the lateral surface of the flange is in firm contact with the inner wall of the housing.

Referring to FIGURE 1, the flange seal of my invention comprises an element in the form of a ring 10 that has a frusto-conical flange or skirt 11 flaring outwardly therefrom. The ring 10 is not flat, but has a bend therein such that an outer portion 12 forms an obtuse angle with the flange 11, and an inner portion 13 forms an obtuse angle with the outer portion 12. Thus, the transverse portion of the ring 10 is provided with a circular ridge 14 that constitutes the portion of the ring that is farthest removed from the edge of the flange 11, and the portion 13 at its innermost part, i.e., at the central opening 15, is axially located closer to the end of the flange 11 than any part of the outer portion 12.

The material of which my seal element is formed has a spring quality, and my invention includes means to prevent axial movement of the part of the portion 13 that is closest to the plane of the end of the flange 11, and to prevent radial movement of the end of the flange 11. A force against the ridge 14, to move it axially toward the end of the flange 11, causes the angle between the portions 12, 13 to increase, thereby expanding the flange 11 outwardly. How this movement of the flange is utilized to effect a fluid seal will now be described with reference to FIGURES 2–4.

A rotatable shaft 16 is shown supported at one end of a sleeve bearing 17 that has its lateral surface engaging the inner wall of a cylindrical housing 18. As shown, the inner end of the bearing 17 seats on a shoulder in the housing 18, to thereby retain the bearing in place.

The ring 10 is inserted in the housing 18 adjacent the bearing 17 and the bearing 17 is provided with a circular rib or projection 19 of reduced diameter.

The rib 19 is disposed in the path of the portion 13 of the element 10, so that upon inserting the ring 10 into the housing 18, the innermost part of the portion 13 abuts the radial surface of the rib 19. The flange 11 extends into the annular space between the outer surface of the rib 19 and the inner wall of the housing 18, with the end of the flange 11 slightly spaced from the inner wall of the housing. As shown, the rib 19 is shaped so that upon inserting the ring 10 into the housing 18, only the innermost part of the portion 13 engages the radial surface of the rib. Thus, the rib or boss 19 provides an axial stop beyond which the innermost part of the ring 10 cannot move, and the inner wall of the housing 18 provides a radial stop for the end of the flange 11.

To resiliently deform the seal, a lock nut 20 is adapted to be threaded into the end of the housing 18. As shown in FIGURE 3, upon turning the nut 20 inwardly of the housing, the inner radial surface of the nut comes into engagement with the ridge 14 of the ring 10. Continued inner movement of the nut 20 forces the rib 14 axially. Such force also causes the portions 12, 13 on the opposite sides of the rib 14 to move axially. Simultaneously, since the end of the flange 11 is prevented from moving radially (by the inner wall of the housing 18), the flattening of the ring 10 expands the flange 11 radially, causing it to "roll" against the inner wall of the housing.

The ring 10 is shaped so that when it is flat, i.e., when the portions 12, 13 are substantially radial, the entire lateral surface of the flange 11 is firmly biased against the inner wall of the housing 18. In such position, the portions 12, 13 are firmly clamped between the nut 20 and the bearing 17, and the flange 11 is immovably held against the inner wall of the housing 18, i.e., the entire lateral surface of the flange is perfectly cylindrical. To aid in establishing this action, the flange is shaped so that it tapers, with the thinnest portion being the edge thereof.

The above-described movement of the flange 11 against the inner wall of the housing 18 is one which eliminates any possibility of the formation of axial grooves in the flange or the inner wall of the housing. By making the lateral surface of the flange and the inner wall of the housing sufficiently smooth, the seal therebetween is positive and complete, thus eliminating any possibility of leakage of fluid between them.

It will also be apparent that the seal element can readily be removed without damage thereto. When the nut 20 is loosened to remove it from the housing 18, the portions 12, 13 return to their normal positions, and in so doing the flange 11 "peels" or moves radially away from the wall of the housing. Obviously, such peeling is effected without marring the inner wall of the housing or the lateral surface of the flange. Consequently, the same seal element can be used again in the manner above described, and with equal effectiveness.

It will be seen that when my unique seal is compressed (FIGURE 4), the opposed radial faces form fluid seals with the nut 20 and the shoulder 18. This allows the seal to be used where there is some type of shaft seal outboard of the cavity formed by the nut and the flange seal. Such cavity, which would be pressurized, requires an effective seal between the engagement nut and the flange.

It will also be apparent that the action of my flange seal may be reversed, and used to seal a shaft.

From the foregoing, it will be apparent that various modifications may be made without departing from the spirit and scope of my invention. For example, a sharp bend does not need to be provided between the portions 12, 13; instead, the transition between these portions can be a surface portion, whereby the ridge 14 is more of the nature of a curved "hump." Further, it is not essential to employ a sleeve bearing to provide the axial stop for the inner part of the portion 13, it being sufficient merely to provide some means having fixed spaced relation with the cylindrical element against which the flange 11 is to be brought into contact. It will also be apparent that the lateral surface of the flange 11 may not be straight, but can be formed of a plurality of circumferential corrugations, it being sufficient that the flange 11 be shaped to provide a plurality of points wherein the seal between the flange and the inner wall of the housing is complete. Accordingly, I do not intend that my invention shall be limited, except as by the appended claims.

I claim:

1. In combination: a housing having a cylindrical bore; means for sealing the wall of the cylindrical bore against leakage of fluid including a frusto-conical tubular element of flexible spring material to be inserted in the housing, the diameter of the large end of said tubular element being substantially equal to the diameter of the bore; and means for spreading the small end of said tubular element radially, thereby to move the lateral surface of said element into snug sealing engagement with the wall of the bore.

2. In combination: a housing having a cylindrical bore; means for sealing the wall of said bore against leakage of fluid including a normally frusto-conical tubular element of spring material, the large diameter end of said element being approximately the inner diameter of the housing; and means forcing the smallest diameter portion of said element radially to the diameter of said large diameter end, said tubular element by virtue of its spring characteristics assuming a cylindrical shape wherein a plurality of circular surface portions thereof sealingly engage the wall of the bore.

3. In combination: a housing having a cylindrical bore; a bearing element in said bore having a boss thereon spaced from the wall of said bore; a normally frusto-conical tubular element of spring metal, the large diameter end of said element being approximately the inner diameter of the bore; a thin ring of spring metal secured at its outer edge to the smaller end of said element, said ring being disposed against said boss, said ring having surface portions of different diameters located radially inwardly of said edge, said surface portions normally being axially displaced; and means forcing said ring against said boss with sufficient force that the axial displacement between them is a minimum, thereby to force the outer edge of said ring radially to sealingly engage the wall of the bore, the spring characteristics of said element being such that in the sealing position of said outer edge the lateral surface of said element is in sealing engagement with the wall of the bore throughout the length of said element.

4. The combination defined in claim 3, wherein said bore is threaded at its outer end, said forcing means including a nut element threaded into said bore for releasably holding said ring against said boss, said ring being operable upon removal of said nut element to allow said tubular element to peel away from said wall.

5. A seal construction comprising: a stiff spring element in the form of a thin ring element having outer and inner portions axially and radially displaced, said ring element having an intermediate portion that is farther removed axially from one than the other of said inner and outer portions, said ring element being made of resilient material so that said outer and inner portions undergo further radial separation upon the axial distance between said one portion and said intermediate portion being decreased; and a tubular element secured at one end to the other of said outer and inner portions, said tubular element extending axially past said one portion, the ends of said tubular element normally being of different diameters, said tubular element being adapted, upon holding the outer end thereof against radial movement, to assume a position wherein the diameter of both ends thereof are equal.

References Cited in the file of this patent

UNITED STATES PATENTS

| | | |
|---|---|---|
| 1,267,124 | Schultes | May 21, 1918 |
| 2,521,692 | Costello | Sept. 12, 1950 |
| 2,567,527 | Parks | Sept. 11, 1951 |
| 2,878,085 | Barnhart | Mar. 17, 1959 |